Figure 1:
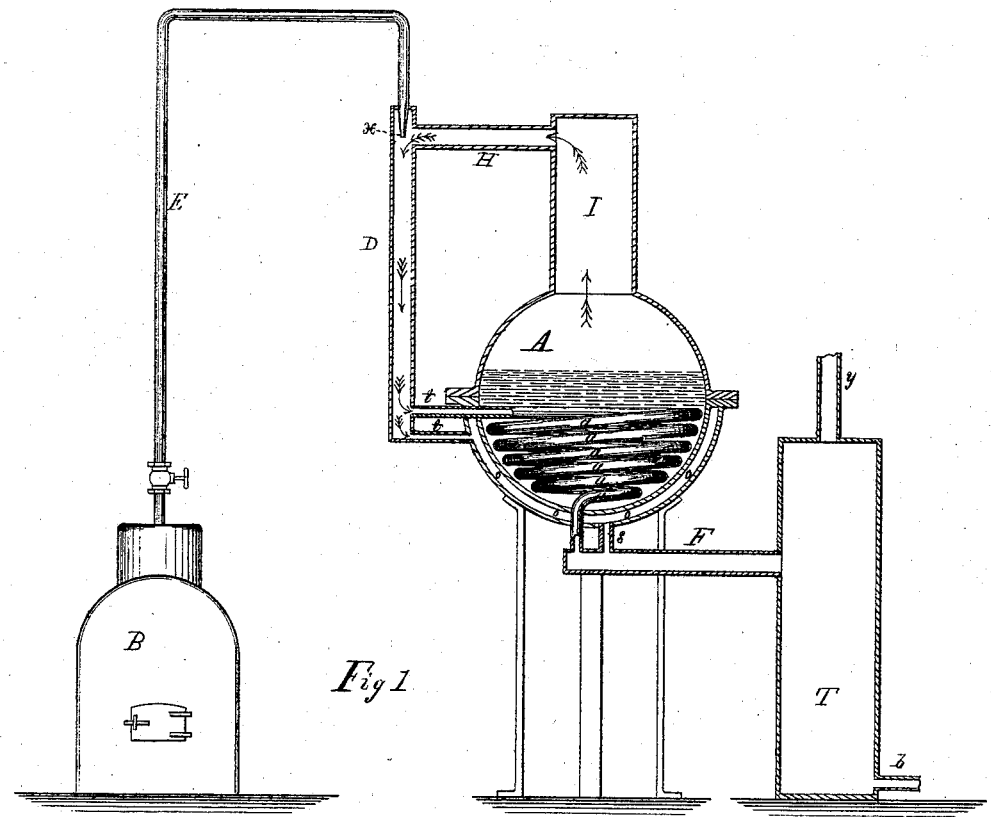

J. B. ROOT.
Vacuum-Pans for the Manufacture of Sugar, &c.

No. 144,358. Patented Nov. 4, 1873.

Witnesses:

Inventor:

UNITED STATES PATENT OFFICE.

JOHN B. ROOT, OF NEW YORK, N. Y.

IMPROVEMENT IN VACUUM-PANS FOR THE MANUFACTURE OF SUGAR, &c.

Specification forming part of Letters Patent No. 144,358, dated November 4, 1873; application filed March 10, 1873.

*To all whom it may concern:*

Be it known that I, JOHN B. ROOT, of the city, county, and State of New York, have invented an Improvement in Evaporating Apparatus, of which the following is a specification:

In the evaporation of many substances used in the arts it has been found necessary, to prevent their injury by too great a heat as well as to hasten the evaporation, to evaporate them in the vessels in which a partial vacuum is maintained, so that they will evaporate at a lower temperature than if exposed to the pressure of the atmosphere. The usual method of doing this is to first produce the vacuum by means of a pump, and, after the liquid begins to evaporate, the vapor arising from it is carried to a condenser, where it is condensed, and the water of condensation removed by a pump or other suitable means. By this method all the heat passing out with the vapor is carried away by the water of condensation and the condensing water, and it is to avoid this loss that my invention has been devised.

My invention consists in combining with an evaporating-pan, used in evaporating all kinds of liquids in a vacuum, an injector, connecting with a dome on the top of the pan, and with the worm used inside the pan or jacket around the same, or with both said worm and jacket, and also with a steam-boiler, in such manner that, by the use of a jet of high-pressure steam, the whole or a portion of the vapor arising from the liquid is forced into the heating-coil, or that part of the pan which conveys the heat to the liquid, thereby saving the heat which is now usually lost.

Figure 1 is a side elevation, partly in section, of an ordinary evaporating-pan, $a$, connected with a steam-boiler, B, by a pipe, E, one end of which terminates in a contracted nozzle inside of a vertical pipe, D, which is of larger diameter than the pipe E. The vertical pipe D is connected at the top, and opposite the nozzle of a horizontal pipe, H, with the dome I on top of the pan A, and at the bottom by two horizontal pipes, $t$ $t$, of which one connects with the worm $a$ $a$, and the other with the steam-jacket $o$ $o$ of the pan A. The lower end of the worm $a$ $a$ is connected with the horizontal pipe E, as is also the steam-jacket $o$ $o$ by the pipe $s$, so that the condensed steam from those parts is conveyed into the chamber T, from whence it is taken through the opening $b$ near the bottom. The steam passing through the worm $a$ $a$ and jacket $o$ $o$ is or may be taken from the top of the chamber T, through the pipe $y$, and conveyed to another pan, where it is used in the ordinary manner. If another pan is not used, all the steam may be condensed in the chamber T.

The operation of my invention is as follows: On the admission of a jet of steam through the nozzle $x$, the air or vapor will be drawn from the top of the liquid in the pan A into the pipe D, and, forced through the worm $a$ $a$ and jacket $o$ $o$, will heat the liquid so as to evaporate it, and the vapor arising from it will be drawn into the pipe D, and forced through the worm and jacket, where its temperature will be increased by the increase of pressure in those parts, and will again give out a portion of its heat to the contents of the pan, the uncondensed steam from the worm and jacket passing out through the pipe F and chamber T.

My invention may be used to return only a portion of the vapor from the pan, the remainder being condensed in the usual way; or, by attaching the exhaust-pipe of a steam-engine to the pipe H, as shown by the dotted lines, the exhaust steam may be forced into the coil and jacket.

What is here claimed, and desired to be secured by Letters Patent, is—

The combination, with an evaporating-vessel, of a system of vapor and steam pipes and contracted nozzle, substantially as herein described, whereby the vapor of the evaporating liquid shall be forced into the steam-heating coil or jacket applied to the same vessel, or their equivalent, by a jet of high-pressure steam, substantially as and for the purpose herein set forth.

In testimony whereof the party hereto has hereunto subscribed his name this 5th day of March, 1873, before two subscribing witnesses.

JOHN B. ROOT.

Witnesses:
HENRY T. BROWN,
MICHAEL RYAN.